United States Patent
Siewert

(10) Patent No.: US 10,583,512 B2
(45) Date of Patent: Mar. 10, 2020

(54) METHOD FOR TUNGSTEN INERT GAS WELDING

(71) Applicant: LINDE AKTIENGESELLSCHAFT, Munich (DE)

(72) Inventor: Erwan Siewert, Niederlauterback (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 531 days.

(21) Appl. No.: 15/119,269

(22) PCT Filed: Mar. 12, 2015

(86) PCT No.: PCT/EP2015/000549
§ 371 (c)(1),
(2) Date: Aug. 17, 2016

(87) PCT Pub. No.: WO2015/135655
PCT Pub. Date: Sep. 17, 2015

(65) Prior Publication Data
US 2017/0008116 A1    Jan. 12, 2017

(30) Foreign Application Priority Data

Mar. 14, 2014 (DE) ......................... 10 2014 003 634
Apr. 10, 2014 (EP) ...................................... 14001321

(51) Int. Cl.
*B23K 9/12* (2006.01)
*B23K 9/10* (2006.01)
(Continued)

(52) U.S. Cl.
CPC ............ *B23K 9/124* (2013.01); *B23K 9/1093* (2013.01); *B23K 9/167* (2013.01); *B23K 9/296* (2013.01)

(58) Field of Classification Search
CPC ...... B23K 9/1093; B23K 9/124; B23K 9/167; B23K 9/296
(Continued)

(56) References Cited

U.S. PATENT DOCUMENTS 2,505,054 A * 4/1950 McElrath, Jr. ........ B23K 9/1336
219/125.12
4,048,465 A * 9/1977 Manz ..................... B23K 9/013
219/121.52
(Continued)

FOREIGN PATENT DOCUMENTS

EP     2 644 306 A1    10/2013
EP     2644306 A1 *  10/2013
(Continued)

OTHER PUBLICATIONS

Machine translation of EP-2,644,306-A1, Dec. 2018.*
Human translation of Japan Patent document No. 61-119,383-A, Dec. 2016.*

*Primary Examiner* — Geoffrey S Evans
(74) *Attorney, Agent, or Firm* — Millen White Zelano & Branigan, PC

(57) ABSTRACT

A method and a welding torch for gas tungsten arc welding is provided for, wherein an electric arc burns between a non-consumable electrode and a workpiece. The interior of the electrode has a cavity through which an electrically conducting filler is fed in the direction of the workpiece, the filler being energized.

11 Claims, 1 Drawing Sheet

(51) Int. Cl.
*B23K 9/167* (2006.01)
*B23K 9/29* (2006.01)

(58) Field of Classification Search
USPC .......................................................... 219/136
See application file for complete search history.

(56) References Cited

U.S. PATENT DOCUMENTS

| | | | | |
|---|---|---|---|---|
| 4,780,594 A * | 10/1988 | Rothermel | ............. | B23K 9/124 |
| | | | | 219/136 |
| 5,994,659 A * | 11/1999 | Offer | .................... | B23K 9/1093 |
| | | | | 219/136 |
| 6,548,191 B2 * | 4/2003 | Osame | ............... | B23K 26/0604 |
| | | | | 428/654 |
| 2002/0158048 A1 * | 10/2002 | Stricklen | .............. | B23K 9/1336 |
| | | | | 219/75 |
| 2012/0298630 A1 * | 11/2012 | Stoutamire | ............ | B23K 9/125 |
| | | | | 219/75 |
| 2014/0027415 A1 * | 1/2014 | Lin | ...................... | B23K 9/1274 |
| | | | | 219/121.63 |
| 2014/0291297 A1 * | 10/2014 | Chen | ........................ | B23K 9/09 |
| | | | | 219/74 |

FOREIGN PATENT DOCUMENTS

| | | | |
|---|---|---|---|
| JP | 61-119383 A | * | 6/1986 |
| JP | H05 77050 A | | 3/1993 |

\* cited by examiner

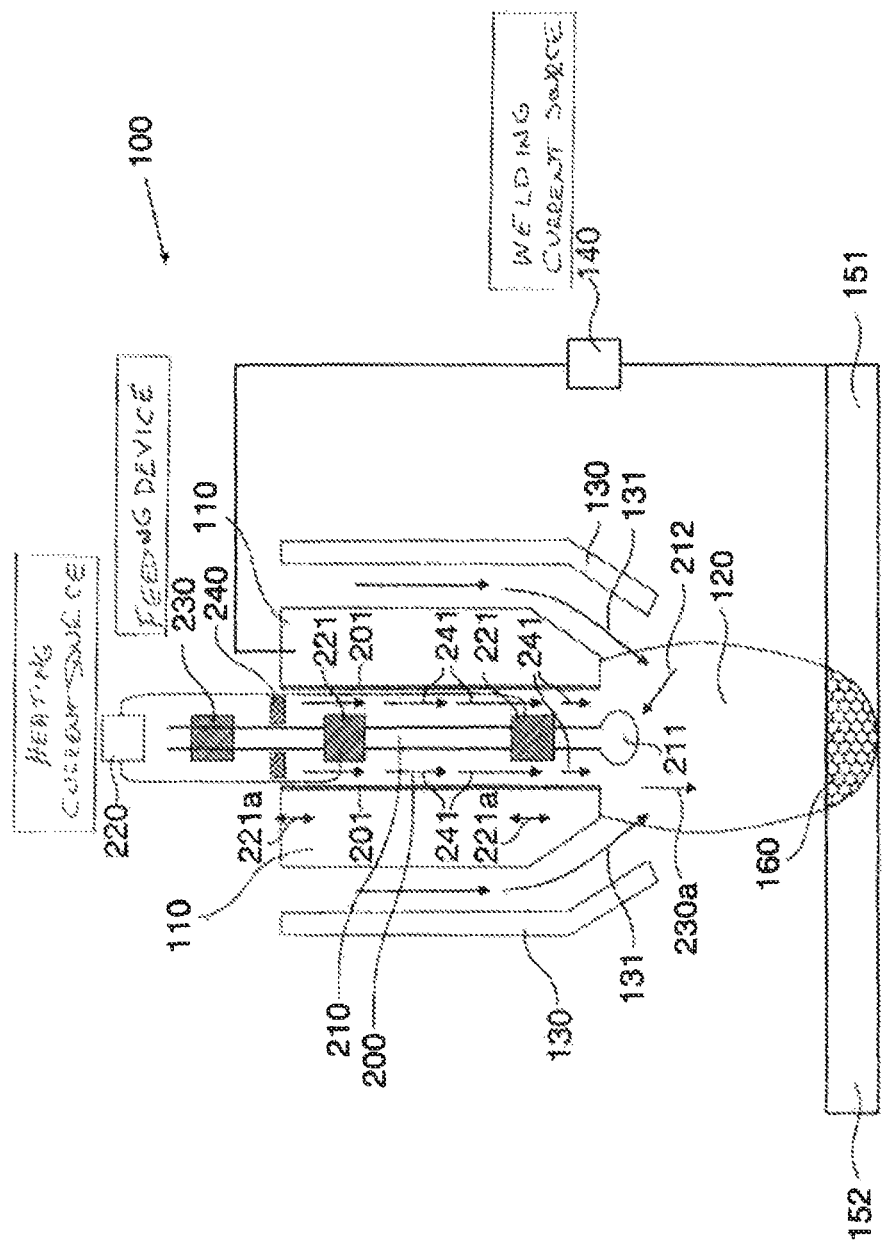

METHOD FOR TUNGSTEN INERT GAS WELDING

CROSS-REFERENCE TO RELATED APPLICATIONS

This application claims priority under 35 U.S.C. § 119 to International Patent Application No. PCT/EP2015/000549 filed on Mar. 12, 2015 which claims priority European Patent Application EP 14 001 321.0 filed on Apr. 10, 2014 which claims priority from German Patent Application DE 102014003634.0 filed on Mar. 14 2014.

BACKGROUND OF THE INVENTION

The invention relates to a method and to a welding torch for tungsten inert gas welding, wherein an arc burns between a non-consumable electrode and a work piece, wherein the electrode in its interior comprises a cavity and wherein an electrically conductive filler is fed through the cavity of the electrode in the direction of the work piece.

Tungsten inert gas welding (TIG-welding) is an arc welding method, which is used for example for deposition welding, welding or brazing of one, two or more work pieces made of metallic materials. The work piece and a tungsten electrode of a suitable welding torch for tungsten inert gas welding are electrically connected to a welding current source. An arc burns between the tungsten electrode and the work piece. Here, the work piece is at least partially melted and there forms the melt pool. The tungsten electrode is mostly used as cathode and the work piece as anode, while electrons from the tungsten electrode migrate into the material.

In contrast with metal inert gas welding (MIG-welding), the tungsten electrode does not melt in tungsten inert gas welding. The melting of a wire electrode in a welding torch for metal inert gas welding can result in overheating and evaporation of said wire electrode, as a result of which large quantities of harmful emissions in the form of welding fumes are liberated. Welding fumes consist of particulate pollutants (mostly metal oxides), which can be inhalable and respirable as well as toxic and/or carcinogenic. Such emission particles are particularly harmful to a welder.

In metal inert gas welding, molten, drops of the wire electrode pass into the melt pools. The melting wire electrode in metal inert, gas welding simultaneously serves as filler or filler material and as arc carrier. In tungsten inert as welding, by contrast, a filler has to be additionally supplied. This (for example wire-shaped) filler is laterally introduced into the arc. Because of this, the filler is melted. Liquid molten drops of this filler detach and pass into the melt pool. This process of melting of the filler, formation of the drop, detaching of the drop and interaction of the drop with the work piece is called material transfer.

In metal inert gas welding, a large part of the energy for melting the wire electrode is introduced by electrons, which pass from the wire electrode into the work piece. This energy introduced by the electrons is called condensation. This energy is fed in by way of a comparatively small area (namely by way of the arc attachment) and to a major part contributes to the overheating and evaporation of the wire electrode and thus to the liberation of the particulate emissions.

Since in tungsten inert gas welding the filler is introduced into the arc without current, the filler is heated only through heat conduction and convection. Condensation, i.e. energy introduced by electrons, does not play a role in tungsten inert gas welding. Consequently, there is no or hardly any overheating and evaporating of the filler in tungsten inert gas welding.

Consequently, the tungsten inert gas welding compared with the metal inert gas welding has the advantage that only a very low quantity of emissions is liberated and in particular hardly any welding fumes are created, even when filler is introduced from the outside. On the other hand, the tungsten inert gas welding compared with metal inert gas welding has the disadvantage that the melting of the filler takes place with a low efficiency or a lower rate of melting than is the case in metal inert gas welding. Furthermore, because of the absent current flow through the filler, no electromagnetic forces such as Lorentz forces can develop either. Such electromagnetic forces favour the detaching of molten drops in the case of fillers through which current flows, which is called "pinching off". Since the in particular wire-shaped filler is mostly laterally fed to the arc, the rotation symmetry of the welding torch is additionally lost.

The tungsten electrode in tungsten inert gas welding can for example be formed as a hollow electrode or hollow cathode. Such a hollow electrode has a cavity in its interior. In particular, this cavity extends over the complete axial extent of the electrode.

Such a hollow electrode is known for example from EP 2 457 681 A1. Therein it is described that a filler can be fed through the cavity of the hollow electrode to tungsten inert gas welding. Because of this, the disadvantage of the absent rotation symmetry can be rectified, but the disadvantages of the low efficiency of the melting of the filler or of the low melting efficiency remains.

In addition to this, the melting of the filler is rendered more difficult in particular in the case of hollow electrodes since the cavity in the hollow electrode also results in a lower axial energy density in the arc. In addition, no electromagnetic forces occur with such a fed-in filler either and no energy is introduced by electrons.

The invention is therefore based on the object of improving the feeding of a filler in tungsten inert as welding and carrying out the same with a higher efficiency.

SUMMARY OF THE INVENTION

This object is solved through a method for tungsten inert gas welding wherein an arc burns between a non-consumable electrode and a work piece, wherein the electrode in its interior comprises a cavity, wherein an electrically conductive filler is fed through the cavity of the electrode in the, direction of the work piece, characterized in that the filler is energized and through a welding torch for tungsten inert gas welding with a non-consumable electrode, wherein the electrode in its interior comprises a cavity, wherein the welding torch is equipped in order to feed an electrically conductive filler through the cavity of the electrode in the direction of the work piece, characterized in that the welding torch is equipped in order to energise the filler. Advantageous configurations are subject of the respective subclaims and of the following description.

With a method for the tungsten inert gas welding according to the invention, an arc burns between a non-consumable electrode and a work piece. In its interior, the electrode has a cavity, wherein an electrically conductive filler is fed through the cavity of the electrode in the direction of the work piece. This filler is energised.

The electrode with the cavity in its interior is called hollow electrode in the following description. The filler is formed in particular wire-shaped. In particular, the filler is electrically insulated from the hollow electrode.

Here, the electrode can be used as cathode, the work piece as anode. A use of the electrode as anode and a use of the work piece as cathode are also conceivable. The electrode is used in particular as cathode when the electrode is formed of tungsten, of hafnium or tungsten doped with (for example CER, thorium, lanthanum and/or other rare earths). The electrode is used in particular as anode when the electrode is formed from copper or from copper with such dopings or inserts.

Through the energising of the filler, the filler is heated or preheated, in particular to a temperature of approximately 600° C. or more (to approximately 1,000° C.). With a conventional hollow electrode, the filler is substantially fed to the welding process at room or ambient temperature. Here, the filler has to he initially heated through the arc or through heat effects (heat conductance and convection) of the arc until the filler melts. In contrast with this, the filler according to the invention is fed to the welding process already preheated. Through the current flow or through electrons, a large part of energy is already fed to the filler (condensation). By way of the arc, only a minor quantity of energy has to be fed to the filler in order to make possible the melting of the filler.

By way of the current flow through the filler and because of the electrical resistance of the filler, heating of the filler takes place. This heating of the filler is called Joule's heat. The Joule's heat has a substantial influence on the formation of drops of the filler, and to a temperature of these drops. By way of the invention, the Joule's heat of the filler can be deliberately utilised.

By way of the invention, the feeding of the filler through the cavity of a hollow electrode is improved in such a manner that the melting of the filler takes place with high efficiency. Accordingly, molten drops of the filler can form in a simple manner and detach with a high frequency and pass into the melt pool. Accordingly, the complete material transfer can be carried out with high efficiency. A melting rate is increased, furthermore, a weld penetration, that is the quantity of energy that is introduced into the work piece, can be increased.

By way of the invention, the advantages of metal inert gas welding and of tungsten inert gas welding are combined. The advantages of metal inert gas welding, i.e. a material transfer with high efficiency, a high melting rate and high weld penetration, can also be utilised for tungsten inert gas welding because of the invention. Nevertheless, evaporation of the filler does riot take place with tungsten inert as welding according to the invention. For this reason, no or hardly any harmful emissions in the form of welding fumes are liberated. Furthermore, by feeding the filler within the hollow electrode a rotation symmetry is made possible with tungsten inert gas welding according to the invention or the welding torch according to the invention.

Furthermore, the advantage of tungsten inert gas welding is retained, namely that the melting rate is decoupled from the energy input in the work piece and can be variably adjusted. In particular, this is made possible through a variable feed or wire feed and adjustable energising of the filler.

Advantageously, the electrode is energised with a welding current. The filler is energised with a heating current independently of the welding current or additionally to the welding current. Current strengths of the heating current and of the welding current are adjusted independently of one another. The filler is electrically insulated in particular from the hollow electrode. By way of the welding current, the arc is influenced, by way of the heating current, the preheating of the filler. Thus, the preheating of the filler can be adjusted or carried out independently of the arc. Thus, the preheating of the filler can be flexibly adjusted and adapted. In particular, the heating current is adapted to the feed or wire feed, to the diameter and/or to the material of the filler.

Preferentially, the heating current or the current strength of the heating current is regulated or controlled as a function of the temperature of the filler. The temperature of the filler is detected in particular by measurement, for example by means of a sensor, for example a thermocouple or a pyrometer. Alternatively or additionally, the temperature of the filler can also be determined by means of the heating voltage of the heating current source, which is applied to the filler. The energising of the filler is thus regulated or controlled in such a manner that a desired temperature of the filler materialises and the filler is thus constantly preheated.

According to a preferred configuration of the invention, the filler is electrically connected to current contact points of a heating current source and thereafter introduced into the cavity of the electrode. At these current contact points, the heating current is conducted onto the wire electrode. In particular, the filler is initially energised by means of the heating current until the filler has a desired temperature. Only when the filler has reached this desired temperature and is thus adequately preheated is the filler introduced into the hollow electrode.

Preferably, a distance of the current contact points relative to one another is changed. In particular, the current contact points are configured in such a manner that their positions on the filler can be changed relative to one another. For example, such current contact points are designed as rollers or slip contacts. Alternatively or additionally, a current strength of filler energising, in particular the current strength of the heating current, is changed. By means of this distance of the current contact points or this current strength, the preheating or the temperature of the filler can be flexibly adjusted. In particular, the distance and/or the current strength are adjusted in such a manner that the filler does not overheat and evaporation of the filler does not occur.

Preferentially, a Joule's heat of the filler is influenced or adjusted. According to Joule's law, a generated heat on an electrical resistance is proportional to the electrical output converted at the electrical resistance and a corresponding time duration. As Joule's heat, a heat energy per time is described here, which develops through continuous losses of electric energy in a conductor because of the current strength and the resistance layer (electrical resistance of the conductor based on its length).

By means of the current contact points, a free wire length l can be adjusted, this free wire length l is in particular the distance of the current points to one another. By means of this free wire length l, the electrical power P converted through the heating current (with current strength I) can be adjusted on the filler according to the following formula:

$$P = I^2 R = I^2 \rho \frac{l}{A}$$

Here, A is the cross-sectional area of the filler. Here, it is appropriate in particular to use a wire-shaped filler. ρ is the specific electrical resistance of the filler.

The Joule's heat ΔW over a period of time ΔT is obtained from this electrical power:

$$\Delta W = P\Delta L = I^2 \rho \frac{\int L}{A}$$

Preferentially, the filler is energised as a function of a feed or a wire feed of the filler. Because of the melting of the filler, the filler has to be fed or advanced. In particular, a wire-shaped filler is appropriate in this case, which is fed with a (in particular variable) feed speed. The preheating or heating of the filler is thus coupled to the feed. In particular for manual welding, the heating current or the energisation of the filler is adapted to the wire feed in an automated manner. The welder thus merely has to adjust the wire feed, the energisation is adjusted automatically.

Furthermore, the wire feed can be adjusted to gap dimension or a gap width of the work piece in particular as a function of a welding speed. The gap dimension or the gap width of the work piece in this case describes the volume to be filled which is to be filled with the molten filler. The volume of the filler to be melted, is thus matched to the volume to be filled.

In particular, the current strength of the energisation of the filler can be increased when the feed is increased. The heating of the filler is kept constant and the drops detach from the filler with a higher frequency. Accordingly, the filler can be fed with higher feed. When the feed is slowed down, the current strength can be correspondingly reduced.

According to a preferred configuration of the invention, a feed of the filler is varied in such a manner that an oscillating movement in feed direction is superimposed on the feed. Through such a variation of the feed, an oscillation of the filler is induced. The feed therefore does not take place continuously, but oscillatingly. Through this superimposed oscillating movement, the filler is moved with a certain frequency in the direction of the work piece and in the opposite direction away from the work piece. In particular through the movement of the filler away from the work piece, a region between the drop and the remaining, not yet molten filler, is tapered. Accordingly, the detaching of the drop is favoured. Through the superimposed oscillating movement, the detaching of the drops is induced or actively promoted. In illustrative terms, the drops are "shaken off" through the superimposed oscillating movement of the filler.

Further preferably, an oscillation frequency of this, superimposed oscillating movement of the filler substantially corresponds to a natural frequency or a resonance frequency of a drop melting off the filler. Through the superimposed oscillating movement of the filler, the drop is induced in particular to an oscillation in the range of its natural frequency. Accordingly, the detaching of the drop is furthermore promoted or induced. Preferentially, the oscillation frequency of the (superimposed) oscillating movement of the filler is between 350 Hz and 450 Hz, in particular 400 Hz.

It is practical when an additional gas is fed to the filler. In particular, the additional gas can be fed through the cavity. The additional gas in this case flows through the cavity in the direction of the work piece, in particular about the filler or along the same. By means of the additional gas, a pressure is exerted on the drop of the filler, further in particular a surface tension of the drop is reduced. Accordingly, the detaching of the drop can be induced or actively promoted.

Furthermore, by means of the in particular inert or reducing additional gas, oxidation of the heated filler can be prevented.

However, the additional gas can also be an active gas. Composition and quantity of the gas can be varied, in particular also during the welding process. In particular, oxygen or a gas mixture with oxygen proportion as additional gas is used. By way of the oxygen, in particular the surface tension is lowered.

Oxidising gases or oxidising gas mixtures as additional gas are fed in this case by way of the heated filler. In particular, an oxidising gas or gas mixture is separated from the electrode in order to prevent (immediate) destruction of the electrode. Preferably, a gas mixture of argon and oxygen (in particular with a maximum oxygen proportion of 10%) or a gas mixture of argon and carbon dioxide (in particular with a maximum dioxide proportion of 20%) is fed as additional gas.

Further preferably, argon, a gas mixture of carbon and hydrogen (in particular with a maximum hydrogen of 10%), a gas mixture of argon and nitrogen (in particular with a maximum nitrogen proportion of 10%) of a gas mixture of argon and helium, in particular with a maximum helium proportion of 90%) is used as additional gas.

In particular, a shielding gas is fed to the welding process. The welding torch for this purpose comprises a practical shielding gas nozzle. The additional gas in this case is fed to the filler in addition to the shielding gas and independently thereof.

The invention furthermore relates to a welding torch for the tungsten inert gas welding. Analogously, configurations of this welding torch according to the invention are obtained from the above description of the method according to the invention.

Further advantages and configurations of the invention are obtained from the description and the attached drawings.

It is to be understood that the features mentioned above and still to be explained in the following cannot only be used in the respective combination stated but also in other combinations or by themselves without leaving the scope of the present invention.

The invention is schematically shown in the drawing by way of an exemplary embodiment and is thoroughly described in the following making reference to the drawing.

BRIEF DESCRIPTION OF THE DRAWINGS

The FIGURE shows a preferred configuration of a welding torch for tungsten inert gas welding according to the invention.

DETAILED DERIPTION OF THE INVENTION

In the FIGURE, a preferred configuration of a welding torch for tungsten inert gas welding according to the invention is schematically shown and marked with 100. The welding torch 100 is equipped for carrying out a preferred embodiment of a method according to the invention. By means of the welding torch 100, a first work piece 151 is welded to a second work piece 152 by way of a joining operation.

The welding torch 100 comprises an electrode 110, which tapers towards its side facing the work piece. The electrode 110 is formed as a hollow electrode and in its interior has a cylindrical cavity 200 which extends over the complete axial extent of the electrode 110.

The first work piece 151 and the hollow electrode 110 are electrically connected to a welding current source 140. The hollow electrode 110 is thus energised with a welding current.

The hollow electrode 110 in this specific example is formed from tungsten and is used as cathode. The first work piece 151 in this specific example is used as anode. It is mentioned that the hollow electrode 110 can also be used as cathode and the first work piece 151 as anode, for example when the hollow electrode 110 is formed from copper.

An arc 120 burns between the hollow electrode 110 and the first work piece 151. Through the arc 120, the first and the second work piece 151 and 152 are at least partially melted, as a result of which a melt pool 160 is created.

The welding torch 100 furthermore comprises a shielding gas nozzle 130 in order to feed a shielding gas in the form of a shielding as flow to the welding process or in the direction of the arc 120 or in the direction of the weld pool 160, indicated by reference number 131.

Furthermore, an electrically conductive filler 210 is fed to the welding process, in particular through a feeding device 230. The filler 210 is designed wire-shaped and is fed through the cavity 200 in the direction 230a of the first and second work piece 151 and 152. The cavity 200 comprises an electrical insulation 201 in order to electrically insulate the filler 210 from the hollow electrode 110.

Before the filler 210 is introduced into the hollow electrode 110, the filler 210 is electrically connected to two current contact points 221 of a heating current source 220. The current contact points 221 in this case are formed in particular as a slip contact. By means of the current contact points 221 and the heating current source 220, the filler 210 is energised with a heating current.

By energising the filler 210 with the heating current, the filler 210 heats up. When the filler 210, in this case wire, has reached a predetermined temperature of for example 600° C., the feed commences. Here, the filler 210 is introduced into the cavity 200 so far that a tip 212 of the filler 210 projects out of the cavity 200 in the direction of the work piece 151.

Through the arc 120, this tip 212 of the filler 210 is heated further. Through this heating, the filler 210 is melted at the tip 212. Consequently a molten drop 211 of the filler 210 is formed.

Finally, the drop 211 detaches from the filler 210, passes into the melt pool 160 and forms a weld seam (joining connection between the work pieces 151 and 152). The forming of the drop 211 and the detaching of the drop 211 from the filler 210 and the transfer into the melt pool 160 is described as material transfer.

The distance of the current contact points 221 relative to one another is variable during the welding process. The current contact points can also be arranged in front of the cavity in order to improve accessibility. Both current contact points 221 in this case can be shifted along the filler 210 independently of one another, indicated by the double arrow 221a. By adjusting the distance of the current contact points 221 and by adjusting the current strength of the heating current, a Joule's heat of the filler 210 is adjusted in particular.

The Joule's heat in this case is the heat energy per time by which the filler 210 is heated because of its electrical resistance and because of their heating current.

By means of the feeding device 230, the filler 210 can be fed or advanced or introduced further into the cavity 200. A feeding direction, in which a corresponding feed takes place, in this case corresponds to the direction 230a, which is directed towards the work pieces 151 and 152. The filler 210 can be present for example wound onto a reel and be unwound through the feeding device 230.

The feed, that is the feed speed of the wire, can be practically varied through the feeding device 230. In particular, the feed is varied in such a manner that an oscillating movement of the filler 210 in feed direction is superimposed on the feed. The filler 210 in this case oscillates in and opposite to the feed direction 230a. A frequency of this oscillation corresponds to a natural frequency of the drop 211 and amounts to in particular 400 Hz. The detaching of the drop 211 is thus induced even more intensively.

The welding torch 100, furthermore, comprises an additional gas feed 240 (only schematically indicated). By means of the additional gas feed 240, an additional gas in the form of an additional gas flow is fed to the filler 210, indicated by the reference number 241. The additional gas flow 241 in this case flows in feed direction 230a axially about the filler 210. Through the additional gas flow 241, gas flows onto the drop 211, as a result of which a surface tension of the drop 211 is reduced and the detaching of the drop 211 induced even further.

For example, a gas mixture or argon and oxygen with an oxygen proportion of 10% is fed as additional gas in the form of the additional gas flow 241. Through the electrical insulation 201 between filler 210 and hollow electrode 110, the additional gas flow is likewise separated from the hollow electrode 110, so that a destruction of the hollow electrode 110 through the additional gas can be avoided.

REFERENCE LIST

100 Welding torch
110 Electrode, hollow electrode
120 Arc
130 Shielding gas nozzle
131 Shielding gas flow
140 Welding current source
151 First work piece
152 Second work piece
160 Melt pool
200 Cavity
201 Electrical insulation
210 Wire-shaped filler
211 Molten drop
212 Tip
220 Heating current source
221 Current contact point, slip contact
221a Double arrow
230 Feeding device
230a Direction, feeding direction
240 Additional gas feed
241 Additional gas flow

What I claim is:

1. A method for tungsten inert gas welding, comprising:
    burning an arc between a non-consumable electrode and a work piece,
    wherein the electrode in its interior comprises a cavity,
    feeding an electrically conductive filler through the cavity of the electrode in a direction of the work piece, and the feeding of the filler is varied in such a manner that an oscillating movement having an oscillation frequency between 350 Hz and 450 Hz of the filler in the feed direction is superimposed on the feed, and
    wherein the filler is energized.

2. The method according to claim 1, wherein the filler is energized as a function of feed, temperature and/or material of the filler.

3. The method according to claim 1, wherein the electrode is energized with a welding current and the filler is energized with a heating current independently of the welding current.

4. The method according to claim 3, wherein the heating current is regulated or controlled as a function of a temperature of the filler.

5. The method according to claim 1, wherein the filler is electrically connected with current contact points of a heating current source and thereafter is introduced into the cavity of the electrode.

6. The method according to claim 5, wherein a distance of the current contact points to one another is changed.

7. The method according to claim 1, wherein a Joule's heat of the filler is adjusted.

8. The method according to claim 1, wherein the feed of the filler is adjusted dependent on a welding speed and/or a gap dimension of the work piece.

9. The method according to claim 1, wherein an oscillating frequency of this oscillating movement of the filler substantially corresponds to a frequency of a drop melting off the filler.

10. The method according to claim 1, wherein an additive gas is fed to the filler.

11. The method according to claim 1, wherein the filler is electrically insulated from the electrode.

* * * * *